(12) United States Patent
Sandoval

(10) Patent No.: US 8,002,291 B1
(45) Date of Patent: Aug. 23, 2011

(54) PANEL TRANSPORT SYSTEM AND METHOD

(75) Inventor: Avelino A. Sandoval, Brentwood, CA (US)

(73) Assignee: Avelino A. Sandoval, Brentwood, CA (US)

( * ) Notice: Subject to any disclaimer, the term of this patent is extended or adjusted under 35 U.S.C. 154(b) by 671 days.

(21) Appl. No.: 11/702,385

(22) Filed: Feb. 6, 2007

(51) Int. Cl.
*B62B 1/26* (2006.01)
*B62B 5/02* (2006.01)

(52) U.S. Cl. ............ 280/47.32; 280/205; 280/79.7

(58) Field of Classification Search .......... 280/645, 280/652, 47.17, 47.18, 47.19, 47.24, 47.26, 280/47.28, 47.29, 47.3, 47.315, 47.32, 79.2, 280/79.7
See application file for complete search history.

(56) References Cited

U.S. PATENT DOCUMENTS

| | | | | |
|---|---|---|---|---|
| 897,853 A * | 9/1908 | Vom Scheidt | ............ | 410/51 |
| 1,176,074 A * | 3/1916 | Malcolm | ............ | 280/11.201 |
| 2,971,773 A * | 2/1961 | McKissick | ............ | 280/205 |
| 3,306,624 A * | 2/1967 | Goss | ............ | 280/47.34 |
| 3,738,672 A * | 6/1973 | Dalton | ............ | 280/3 |
| 3,953,048 A * | 4/1976 | Vincent et al. | ............ | 280/47.3 |
| 4,062,558 A * | 12/1977 | Wasserman | ............ | 280/205 |
| 4,194,751 A * | 3/1980 | Shinmura | ............ | 280/11.201 |
| 5,005,845 A * | 4/1991 | Haueter, Jr. | ............ | 280/1.5 |
| 5,098,087 A * | 3/1992 | Matile et al. | ............ | 482/68 |
| 5,158,312 A * | 10/1992 | Lausch | ............ | 280/79.7 |
| D340,337 S * | 10/1993 | Beasley | ............ | D34/23 |
| 5,697,624 A * | 12/1997 | Faraj | ............ | 280/47.19 |
| 5,782,477 A * | 7/1998 | Covert | ............ | 280/79.7 |
| 6,955,367 B1 * | 10/2005 | Simonsen et al. | ............ | 280/78 |
| 7,175,188 B2 * | 2/2007 | Joncourt | ............ | 280/47.17 |
| 7,287,777 B2 * | 10/2007 | Agee et al. | ............ | 280/652 |

* cited by examiner

*Primary Examiner* — Hau V Phan
*Assistant Examiner* — Bridget Avery

(57) ABSTRACT

A heavy panel transport system and method. The system includes a load-bearing horizontal bar for supporting a substantially planar panel placed upon the horizontal bar. The system also includes a lateral support bar attached to the horizontal bar to provide sideways support to the substantially planar panel. The system also includes a wheel system operable without gears. The wheel system includes a wheel disposed between a fork. Here, the horizontal bar and lateral support bar are then mounted over the wheel system for steering and propelling the system in a desired direction.

15 Claims, 4 Drawing Sheets

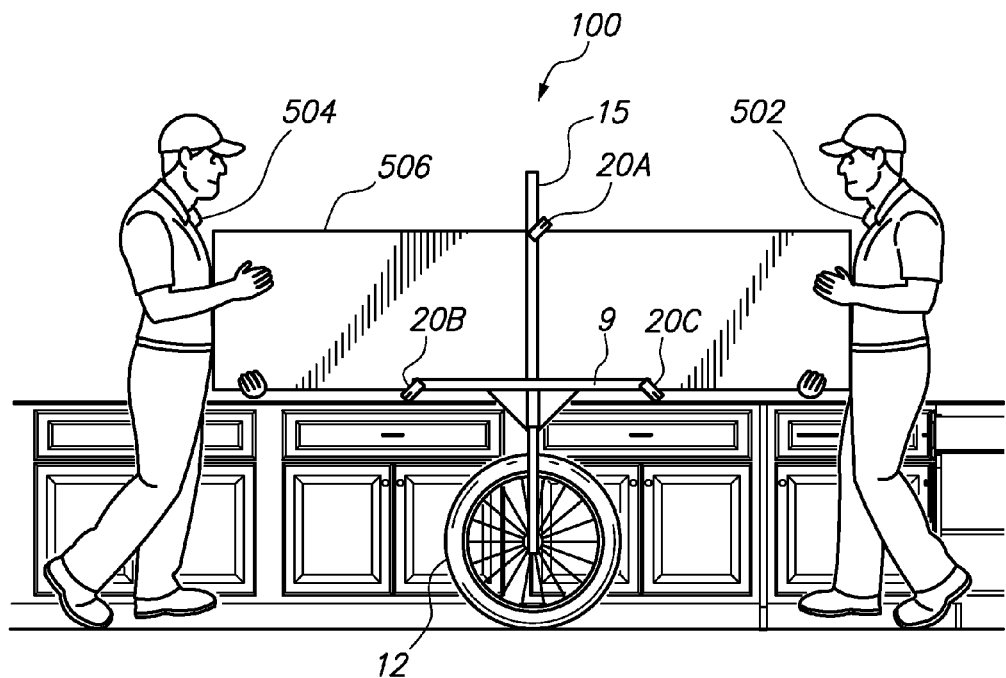
FIG. 5
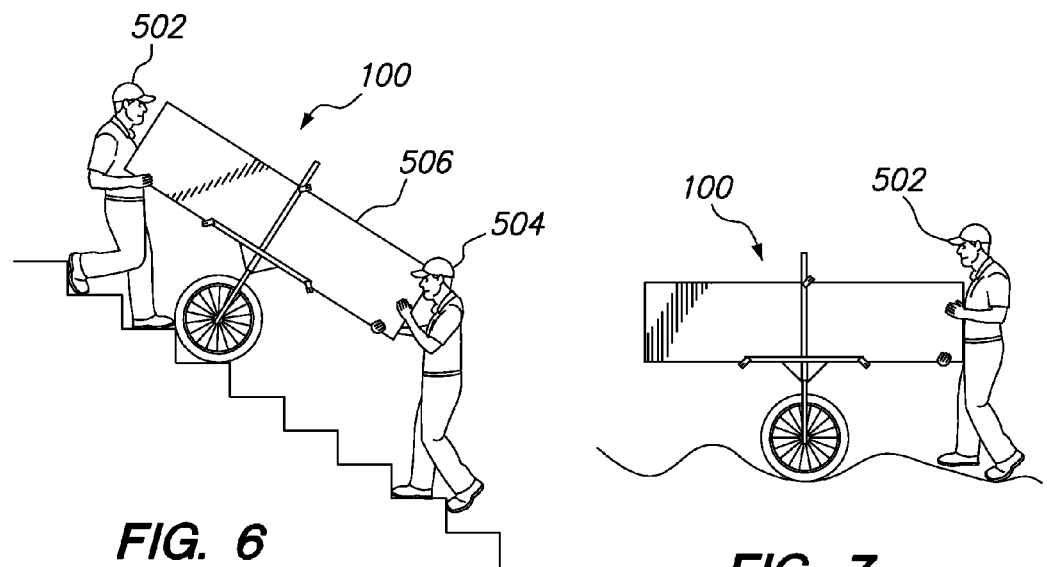
FIG. 6
FIG. 7

PANEL TRANSPORT SYSTEM AND METHOD

BACKGROUND OF THE INVENTION

The present invention relates generally to material or article handling systems and methods and more specifically to material or article handling systems and methods for carrying The stone fabrication industry has been experiencing tremendous growth for some time. The industry provides stone fabrication of heavy paneled materials including butcher blocks, granite, marble, drywall, doors, etc. for the construction or other relevant industries and for the consumer markets such bathroom and kitchen remodeling.

It is not unusual for a typical slab to weigh over 400 lbs (181 kg) and to extend over 10 ft (3.04 m) in length. A fabricator wishing to transport a slab from the street into a home or business typically employs another individual to assist with delivery. Here, the fabricator supports the slab on one end while the assistant supports the other end. The slab is then carefully carried by hand into the home or business.

Sometimes, a slab might fall down and break or develop a crack during delivery. If so, another stone must be picked up from the warehouse and then redelivered to the home or business. Thereafter, the slab can be installed for use by the homeowner.

When the next stone fabrication order is received, the fabricator assisted by the assistant must repeat the carrying process for delivery. In some instances, the fabricators carry slabs over flights of stairs; in other instances, slabs are carried over uneven terrain. In any event, subsequently, the slab is then delivered to the home or business for installation.

When the next stone fabrication order is received, the aforementioned hand delivery process is again repeated. The process is repeated for every order, day in and day out, year after year. In fact, some fabricators are known to have been involved with this delivery practice for many years.

The above-described context is also applicable to delivery of non-stone materials. Persons delivering drywall, heavy-panel wood doors and other similar materials must repeat the above-mentioned hand-delivery over extended periods of time.

There is a need to address one or more of the foregoing disadvantages of conventional systems and methods, and the present invention meets this need.

BRIEF SUMMARY OF THE INVENTION

Various aspects of a panel transport system and method can be found in exemplary embodiments of the present invention.

In a first embodiment, the panel transport system includes a load-bearing horizontal bar upon which a marble or granite slab, sheetrock or other similar type substantially planar panels can be placed. A lateral support bar running upwardly is attached preferably to a midpoint of the horizontal support bar to provide lateral support and prevent the slab from falling off the horizontal panel. Clamps are then employed to secure the slab onto the lateral support bar as well as the horizontal bar.

The panel transport system also includes a wheel system operable without gears. This wheel system includes a wheel disposed between an inverted U-shaped fork. The horizontal and lateral support bar is mounted on the fork and wheel so that a plane formed by said horizontal bar is substantially aligned and parallel with a plane formed by the wheel. Once secured on the panel transport system, the slap can be propelled and steered by one or more users causing the wheel and load to move in a desired direction.

In this manner and unlike conventional systems, fabricators need not manually carry slabs day in and day out, and order after order for many years. The tremendous stress and fatigue on the body caused by carrying such heavy loads for extended periods of time can be avoided. The present invention transports heavy panels over stairs and uneven terrain from the street into a business or home where the heavy panels can be installed.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 5 illustrates operation of a transport system according to an exemplary embodiment of the present invention.

FIG. 6 illustrates operation of a transport system according to an exemplary embodiment of the present invention.

FIG. 7 illustrates operation of a transport system according to an exemplary embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figures 1, 2:
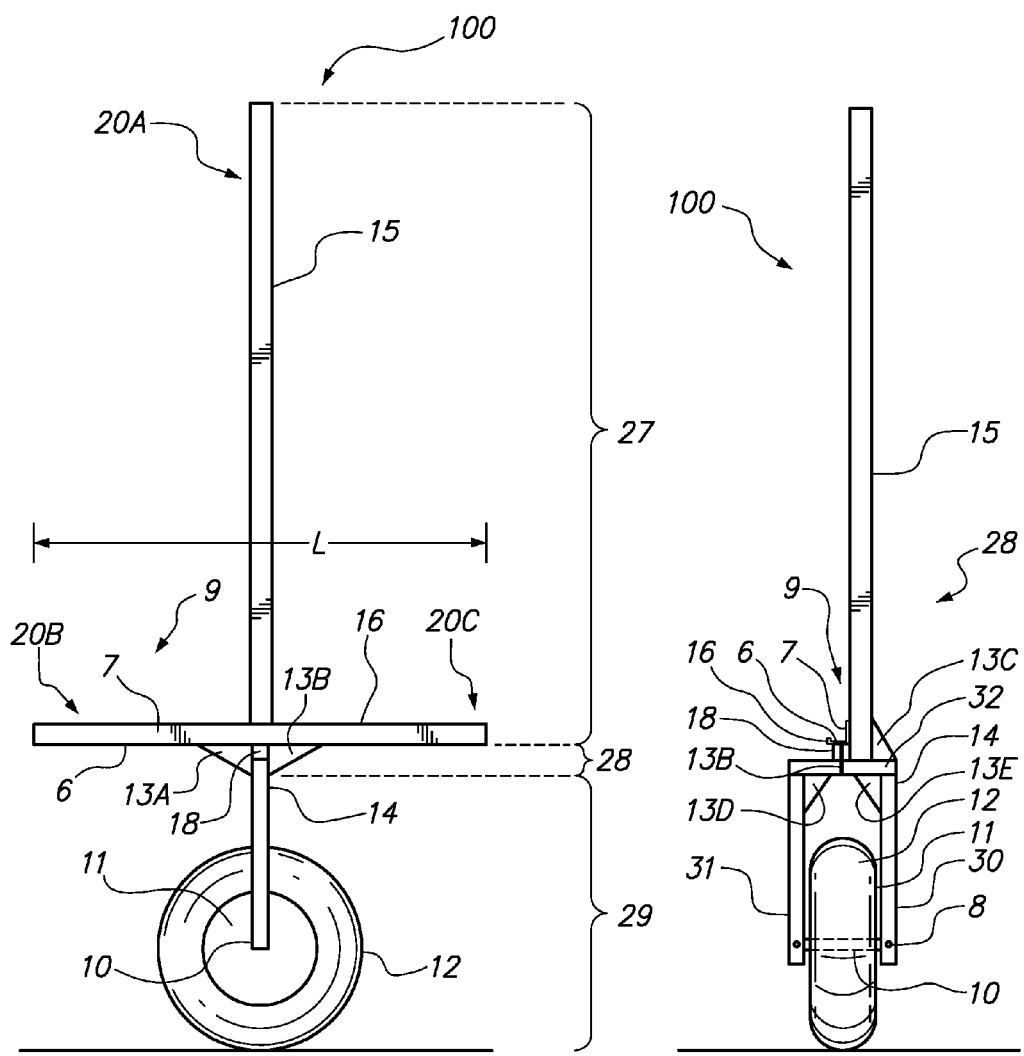
FIG. 1 illustrates a side view of a transport system according to an exemplary embodiment of the present invention.
FIG. 2 illustrates a front view of the transport system of FIG. 1 according to an exemplary embodiment of the present invention.

FIG. 1 illustrates a side view of transport system 100 according to an exemplary embodiment of the present invention.

In FIG. 1, among other components, transport system 100 comprises three main sub-systems namely load-bearing system 27, attachment system 28 and wheel system 29. As shown, attachment system 28 secures load-bearing system 27 to wheel system 29.

Load-bearing system 27 itself comprises vertically oriented mast 15 fixedly attached to horizontal support 9. The fixed attachment can be by fastening such as welding, screws, dowels and pins or other comparable fasteners.

As implied by its name, horizontal support 9 is a substantially horizontal and planar panel that is load-bearing. Specifically, horizontal support 9 can carry slabs, granite and other type heavy loads for transportation from one location to the other. Horizontal support 9 is substantially lengthy since it must support materials that are lengthy relative to their height.

Horizontal support 9 is also sufficiently rigid and thick in order to support heavy loads. In one embodiment, horizontal support 9 is 1.75 inches (4.445 cm) thick. An exemplary length of horizontal support 9 is 36 inches (91.44 cm) having a width of 7.5 inches (19.05 cm). Horizontal support 9 is also about 24 inches (60.96 cm) from a flooring surface. Preferably, horizontal support 9 is constructed of steel with a powder coat finish although other suitable materials such as wood, aluminum can be utilized.

Mast 15 is a flat-surfaced bar perpendicularly disposed to horizontal support 9, attaching to horizontal support 9 at a point that bisects the length L of horizontal support 9 into substantially two equal halves. For example, if L is 36 inches (91.44 cm), mast 15 extends radially and outwardly at a midpoint 16 inches (45.72 cm) from horizontal support 9. The flat surface of mast 15 enables materials to rest flush on the surface and to provide lateral support to such materials received by horizontal support 9.

Mast 15 also provides a vertical clamping point 20A to stabilize materials that are received by horizontal support 9. Specifically, since materials such as slabs possess a high center of gravity (they are substantially higher relative to their thickness), vertical clamping point 20A works cooperatively with mast 15 to hold materials that are being transported.

In one embodiment, mast 15 might have a height of 50.6625 inches (128.682 cm). Mast 15 itself is such that it forms an inverted T configuration with horizontal support 9, the leg of said T configuration being aligned with mast 15 while the cross bar of said T configuration is aligned with horizontal support 9. Note that the provided height of mast 15 is exemplary and can be as high as necessary to support the slabs that are transported. As noted, mast 15 is also substantially flat to provide a surface on which materials being transported can rest and on which such materials can be clamped for transportation. As shown, clamps 20A, 20B and 20C are utilized substantially near the top of mast 15 as well as at both ends of horizontal support 9, respectively.

In an alternate embodiment, horizontal support 9 is at a height of 34 inches (86.36 cm) from a flooring surface. Horizontal support 9 also has a slip guard 16 formed upon the surface of horizontal support 9, said surface being the surface that receives materials to be transported. As implied by its name, slip guard 16 provides proper friction and prevents materials from slipping off of the surface of horizontal support 9. Slip guard 16 can be made of rubber, silicone or other polymeric materials.

The cross-section of horizontal support 9 is L shaped or has an L shaped configuration having a lower portion 6 and an upper portion 7 (see also FIG. 2). The lower portion 6 and the upper portion 7 are normal to each other and are attached along one edge to form a corner. The upper portion 7 radiates radially from a longitudinal axis of the lower portion 6 forming a back that is attached to mast 15. In this manner, lower portion 6 and lower portion 7 form a corner into which the perpendicular corners of materials such as slabs and granites can securely fit. This corner also allows a material to be held upright against mast 15 for clamping by clamps 20A, 20B and 20C.

Transport system 100 further comprises wheel system 29. It is on wheel system 29 that the inverted T configuration of mast 15 and horizontal support 9 is mounted. Wheel system 29 comprises fork 14, tire 12, ring 11 and axle 10 all of which are further illustrated in FIG. 2.

Referring now to FIGS. 1 and 2, fork 14 has an inverted U shaped configuration with one leg 30 and the other leg 31 fixedly attached to a cross bar or upper portion 32. Axle 10 which supports ring 11 and tire 12 is mounted between leg 30 and leg 31. Specifically, one end of axle 10 is rotatably coupled to leg 31 while the other end is rotatably coupled to leg 30.

Load-bearing system 27 and its inverted T configuration is mounted on wheel system 29 by attaching a proximal end of mast 15 to a midpoint of upper portion 32. Here, the plane of horizontal support 9 is substantially aligned and parallel with the plane of tire 12. The diameter of axle 10 is preferably ¾ inches (1.905 cm). Axle 10 is secured by two ¼ inch (0.635 cm) button head bolts (not shown).

In FIG. 1, attachment system 28 secures load-bearing system 27 and wheel system 29. Among other components, attachment system 28 uses conjoiner 18, gusset 13A, gusset 13B and gusset 13C (FIG. 2) to secure load-bearing system 27 onto wheel system 29. Conjoiner 18 is preferably a metal piece placed along and aligned with mast 15 and below horizontal support 9 in order to attach horizontal support 9 to fork 14. Conjoiner 18 also attaches mast 15 to fork 14.

Gussets 13A and 13B are corner pieces, that is, each is triangularly shaped for each of the two corners formed by horizontal support 9 and mast 15. When gusset 13A is placed as shown in FIG. 1, its upper (horizontal) surface attaches to the lower surface of horizontal support 9. Its lateral or vertical surface then attaches to conjoiner 18 and cross bar 32. Similarly, when gusset 13B is placed as depicted in FIG. 1, the upper (horizontal) surface attaches to the lower surface of horizontal support 9 while the lateral or vertical surface attaches to conjoiner 18 and cross bar 32. Gusset 13C of FIG. 2 attaches to mast 15 on one side and attaches to fork 14 on the other side.

In this regard, additional gussets may be employed to strengthen fork 14. For example, the corner between leg 39 and upper portion 31 is strengthened by gusset 13D. Gussets are preferably attached by welding although other fastening means can be utilized. The corner between leg 30 and upper portion 31 is also strengthened by gusset 13E which can also be fastened by welding although other comparable means can be used as well.

Figures 3, 4:
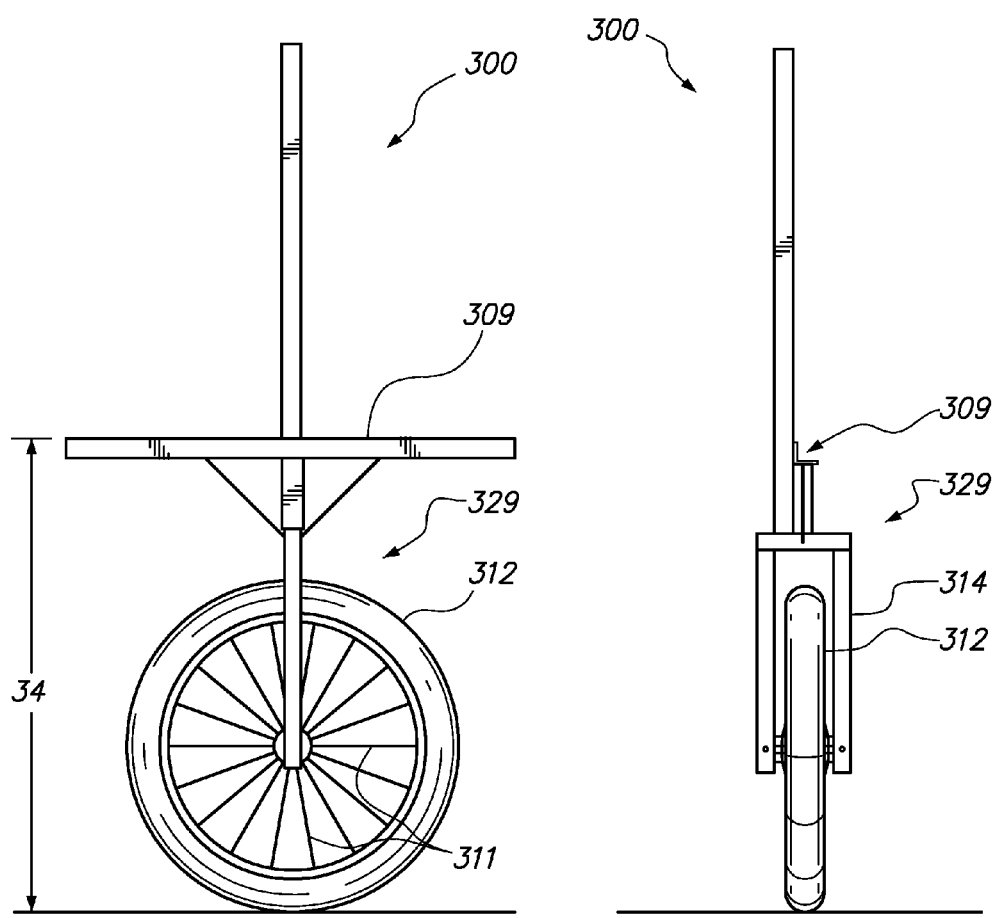
FIG. 3 shows a side view of a transport system according to an exemplary embodiment of the present invention.
FIG. 4 illustrates a front view of the transport system of FIG. 3 according to an exemplary embodiment of the present invention.

FIG. 3 shows a side view transport system 300 according to an exemplary embodiment of the present invention.

In FIG. 3, transport system 300 includes wheel system 329. Wheel system 329 includes tire 312. Unlike the embodiment of FIG. 1, tire 312 comprises a plurality of spokes 311 without a rim. In this embodiment, there are 32 spokes, each spoke having a length of 26 inches (66.04 cm).

Transport system 300 further comprises horizontal support 309 that is about 34 inches (86.36 cm) from the surface of the ground, such height being that of a standard cabinet from ground level. This height and wheel configuration makes transport system 300 particularly suitable for slabs and other such materials intended for kitchen countertops. In FIG. 3, various lengths and heights of components are also shown. One skilled in the art will realize that the provided lengths and heights are exemplary.

FIG. 4 illustrates a front view of transport system 300 according to an exemplary embodiment of the present invention.

In FIG. 4, transport system 300 has wheel system 329 with fork 314 having a U-shaped configuration. The L-shaped configuration of the cross-section of horizontal support 309 is also more clearly illustrated. Operation of the present invention is now described below with reference to FIGS. 5, 6, 7 and 8.

FIGS. 5, 6, 8 and 9 illustrate operation of transport system 100 according to an exemplary embodiment of the present invention.

In FIG. 5, user 502 and user 504 wish to employ transport system 100 for transporting granite slab 506. Here, granite slab 506 is a relatively heavy panel weighing about 420 lbs (190.68 kg). Although not shown, slab 506 can be other panel types namely arry heavy paneled materials including slabs, butcher blocks, drywall, plywood, marble, stone, Durarock, doors, Gluams, etc.

Initially, transport system 100 is retained in an upright position with tire 12 on the ground and mast 15 aligned along a vertical axis. At this point, clamp 20A, clamp 20B and clamp 20C are off or open. Thereupon, user 502 grasps one end of granite slab 506 while the other end is grasped by user 504. Granite slab 506 is then lifted onto horizontal support 9. Granite slab 506 is positioned so that its weight is evenly distributed onto horizontal support 9. It also ensured that the bottom edge of the granite slab interfaces and sits flush with the corner of the L-shaped horizontal support 9.

Thereafter, clamp 20A is applied to secure granite slab 506 to mast 15 while clamp 20B and clamp 20C are applied to secure opposite ends of granite slab 506 to horizontal support 9. Once granite slab 506 is properly secured, user 502 grasps one end while user 504 supports the opposite end of granite slab 506. At this point, pushing or pulling granite slab 506 (now secure on transport system 100) propels transport system 100 in a forward or backward direction whereupon tire 12 begins to rotate on the ground in the desired direction.

In this manner, granite slab 506 is transported from the street, for example, into a home or business where the granite is installed for use. Transport system 100 finds use in kitchen remodeling wherein the embodiment of FIG. 3 can be utilized for transporting granite or marble slabs for kitchen countertops as shown in FIG. 6. In fact, user transport system 100 can be used to move slabs up and down stairs as illustrated in FIG. 7. Transport system 100 also finds use in moving slabs and other materials over uneven terrain as shown in FIG. 7. In fact, transport system 100 can be employed by a single user 502 for relatively light loads (e.g., 125 lbs (56.625 kg)).

Figure 8:
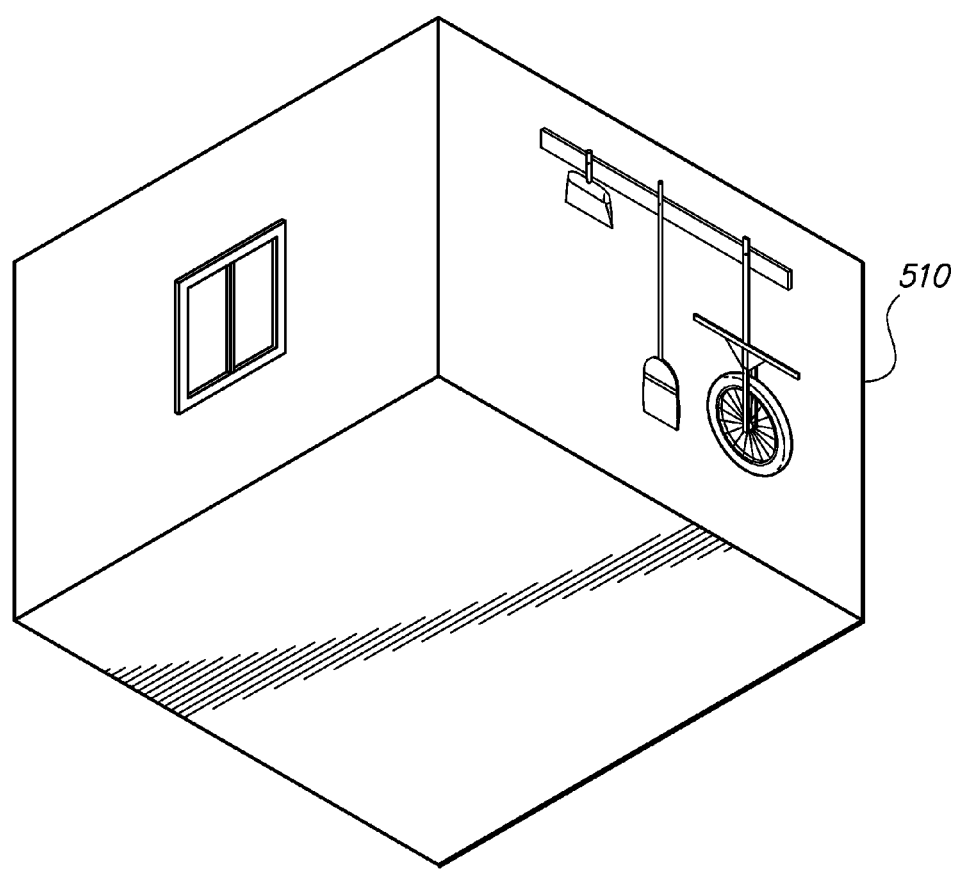
FIG. 8 illustrates storage of a transport system according to an exemplary embodiment of the present invention.

After granite slab 506 arrives at the installation point, clamps 20A, 20B and 20C are removed, and granite slab 506 is lifted by users 502 and 504 from transport system 100 onto the installation surface. Upon completion, transport system 100 is light and compact and easily stowed in storage area 510 (FIG. 8).

In this manner, the present invention can prevent the stress and strain associated with carrying heavy paneled materials, particularly year after year. Back sprain and other injuries associated with manually carrying heavy panels can be avoided. Time and money can also be saved as the present invention reduces damage to stones, slabs and other heavy panel material being transported.

While the above is a complete description of exemplary specific embodiments of the invention, additional embodiments are also possible. Thus, the above description should not be taken as limiting the scope of the invention, which is defined by the appended claims along with their full scope of equivalents.

The invention claimed is:

1. An apparatus for transporting heavy panels, said apparatus comprising:
   an elongated horizontal bar supporting a heavy panel placed horizontally lengthwise upon said elongated horizontal bar;
   a vertical bar against which a side of the heavy panel is rested to provide lateral support, said vertical bar extending normal and radially upward from a substantially midpoint of said elongated horizontal bar to a distal end that is generally above a width of said heavy panel placed upon said elongated horizontal bar;
   a fork having an inverted U-shaped configuration, said fork having a U-shaped section and a first leg and a second leg; and
   a wheel mounted on an axle, said axle being attached to extend from the first leg directly to said wheel and directly to said second leg of said fork so that said wheel is centrally disposed between said first leg and said second leg and said wheel is rotatable both in a forward direction and a backward direction,
   wherein said elongated horizontal bar is a length that is at least a diameter of said wheel,
   wherein said elongated horizontal bar is adjacent to and substantially disposed over the U-shaped section of said fork, and wherein said wheel has an outermost circumference that lies in a vertical plane, said vertical plane extending upwardly through a substantial midpoint of a width of said elongated horizontal bar.

2. The apparatus of claim 1 further comprising fixedly attaching a proximal end of said vertical bar to said midpoint of said horizontal bar.

3. An apparatus comprising:
   an elongated horizontal bar extending substantially along a latitudinal axis, said elongated horizontal bar supporting a substantially planar panel placed upon said elongated horizontal bar;
   at least one lateral support bar having a proximal end fixedly attached to said elongated horizontal bar, said at least one lateral support bar extending upwardly from said elongated horizontal bar to a distal end above the substantially planar panel, and
   said at least one lateral support bar providing sideways support to said substantially planar panel placed upon said elongated horizontal bar;
   a fork having an inverted U-shaped configuration, said fork having a U-shaped section and a first leg and a second leg;
   a wheel for moving the substantially planar panel, said wheel being centrally disposed between the first and the second legs of said fork and said wheel is rotatable in both a forward direction and a backward direction;
   wherein said elongated horizontal bar is a length that is at least a diameter of said wheel and,
   wherein said proximal end of said at least one lateral support bar is mounted adjacent and over the U-shaped section of said fork and,
   wherein said wheel has an outermost circumference that lies in a vertical plane, said vertical plane extending upwardly through a substantial midpoint of a width of said elongated horizontal bar.

4. The apparatus of claim 3 wherein a cross-section of said elongated horizontal bar is L-shaped.

5. The apparatus of claim 3 further comprising at least one clamp for securing the substantially planar panel onto the elongated horizontal bar.

6. The apparatus of claim 3 further comprising at least one clamp for securing the substantially planar panel onto the lateral support.

7. The apparatus of claim 3 wherein said substantially planar panel rests horizontally lengthwise on the elongated horizontal bar.

8. The apparatus of claim 3 wherein said substantially planar panel is selected from any one of a granite slab, a marble slab, a butcher block, dry wall, a heavy door and plywood.

9. The apparatus of claim 3 wherein said substantially planar panel is steerable by at least two users.

10. The apparatus of claim 9 wherein said wheel is rotatable as said substantially planar panel is steered.

11. The apparatus of claim 3 wherein said wheel is comprised of a rim.

12. The apparatus of claim 3 wherein said wheel is comprised of a plurality of spokes.

13. The apparatus of claim 1 further comprising a conjoiner that secures the at least one lateral support to the fork.

14. The apparatus of claim 1 wherein a cross-section of said elongated horizontal bar is L-shaped.

15. The apparatus of claim 1 further comprising at least one clamp for securing the heavy panel onto the elongated horizontal bar.

* * * * *